United States Patent
Asselin et al.

(10) Patent No.: US 11,022,778 B2
(45) Date of Patent: Jun. 1, 2021

(54) OPTICAL SYSTEM MOUNTS

(71) Applicant: Goodrich Corporation, Charlotte, NC (US)

(72) Inventors: Luke N. Asselin, Amesbury, MA (US); Davis Lange, Sturbridge, MA (US); Gordon Sim, Saugus, MA (US); Christopher William Helmke, Bedford, NH (US)

(73) Assignee: Goodrich Corporation, Charlotte, NC (US)

( * ) Notice: Subject to any disclaimer, the term of this patent is extended or adjusted under 35 U.S.C. 154(b) by 164 days.

(21) Appl. No.: 16/057,510

(22) Filed: Aug. 7, 2018

(65) Prior Publication Data

US 2020/0049944 A1    Feb. 13, 2020

(51) Int. Cl.
*G02B 7/182*    (2021.01)
*G02B 7/00*    (2021.01)

(52) U.S. Cl.
CPC .......... *G02B 7/1828* (2013.01); *G02B 7/003* (2013.01)

(58) Field of Classification Search
CPC .............................. G02B 7/182; G02B 7/1828
USPC .......................... 359/871, 872, 903; 248/467
See application file for complete search history.

(56) References Cited

U.S. PATENT DOCUMENTS

| | | | | |
|---|---|---|---|---|
| 2,985,749 A * | 5/1961 | Johnson | .................... | B60Q 1/24 362/517 |
| 3,589,049 A * | 6/1971 | Cornelius | ........... | B42F 13/0006 40/722 |
| 4,078,859 A * | 3/1978 | Sharett | .................... | B60R 1/087 359/604 |
| 4,281,898 A * | 8/1981 | Ochiai | ................. | G02B 7/1828 359/606 |
| 4,390,234 A * | 6/1983 | Embach | ............... | G03H 1/0402 359/32 |
| 4,906,087 A * | 3/1990 | Ealey | ................. | G02B 26/0825 359/849 |
| 4,973,020 A * | 11/1990 | Canadas | ................ | B60J 3/0282 248/206.5 |
| 5,061,056 A * | 10/1991 | You | ......................... | B60R 1/076 248/475.1 |

(Continued)

FOREIGN PATENT DOCUMENTS

JP    S579911 A    1/1982
JP    2003029184 A    1/2003

OTHER PUBLICATIONS

Extended European search report issued in corresponding EP Application No. 19189847.7, dated Dec. 13, 2019.

*Primary Examiner* — Ricky D Shafer
(74) *Attorney, Agent, or Firm* — Locke Lord LLP; Scott D. Wofsy; Daniel J. Fiorello

(57) ABSTRACT

An optical system mount assembly can include a first post and a movable mount configured to mount an optical element, the moveable mount being configured to move relative to the first post assembly between a first position and a second position. The assembly can include a first magnetic latch system member disposed on or within the first post, and a second magnetic latch system member disposed on or within the moveable mount such that the first magnetic latch system member magnetically interacts with the second magnetic latch system member to magnetically latch the moveable mount to the first post in the first position.

17 Claims, 1 Drawing Sheet

(56) References Cited

U.S. PATENT DOCUMENTS

| | | | |
|---|---|---|---|
| 5,355,254 A * | 10/1994 | Aymerich | B60J 3/0282 |
| | | | 16/295 |
| 5,638,222 A | 6/1997 | Shigehara | |
| 5,706,143 A * | 1/1998 | Hipp | G02B 23/2476 |
| | | | 126/4 |
| 5,907,433 A | 5/1999 | Voigt et al. | |
| 5,953,052 A * | 9/1999 | McNelley | H04N 7/144 |
| | | | 348/14.16 |
| 6,322,222 B1 * | 11/2001 | Kobayashi | G02B 5/08 |
| | | | 248/467 |
| 8,614,742 B2 | 12/2013 | Stowe et al. | |
| 9,448,384 B2 | 9/2016 | Erath et al. | |
| 2017/0139181 A1 | 5/2017 | Du | |

* cited by examiner

OPTICAL SYSTEM MOUNTS

BACKGROUND

1. Field

The present disclosure relates to mounts for optical systems, e.g., for mirror systems used in aircraft or other vehicles.

2. Description of Related Art

Optical systems (e.g., mirror systems) and mounting systems therefore (e.g., mirror mounting systems) can be used in aircraft for or other vehicles. Traditional systems use hard stops along with costly flexures (e.g., a complex leaf spring) to ensure mechanism mirrors maintain optical alignment under all operating loads of the aircraft or other vehicle.

Such conventional methods and systems have generally been considered satisfactory for their intended purpose. However, there is still a need in the art for improved optical system mounts. The present disclosure provides a solution for this need.

SUMMARY

An optical system mount assembly can include a first post and a movable mount configured to mount an optical element, the moveable mount being configured to move relative to the first post assembly between a first position and a second position. The assembly can include a first magnetic latch system member disposed on or within the first post, and a second magnetic latch system member disposed on or within the moveable mount such that the first magnetic latch system member magnetically interacts with the second magnetic latch system member to magnetically latch the moveable mount to the first post in the first position.

In certain embodiments, the first magnetic latch system member can be a permanent magnet. For example, the first latch system member can be a rare-earth magnet.

In certain embodiments, the second magnetic latch system member can be a ferromagnetic element. For example, the ferromagnetic element can be a metallic screw. In certain embodiments, the second magnetic latch system member can be a permanent magnet.

At least one of the first magnetic latch system member and the second magnetic latch system member can be adjustable such that an attraction force between the first magnetic latch system member and the second magnetic latch system member is adjustable. For example, the second latch system member can be moveable relative to the movable mount to change the distance of the second magnetic latch system member relative to the first magnetic latch system member when in the first position.

The first position can be an upright alignment position. The optical element can be a mirror and, therefore, the moveable mount can be a mirror mount.

The assembly can further include one or more stop members extending from at least one of the first post member or the moveable mount. The one or more stop members can include one or more fixed stop members disposed on the first post member. The one or more fixed stop members can include three or more fixed stop members, for example, or any other suitable number, depending on the platform or mirror adjustment application.

The one or more stop members can include one or more adjustable stop members configured to allow adjustment of the distance between the first post and the moveable mount in the first position to allow alignment of the optical element and/or to allow adjustment of an attraction force between the first magnetic latch system member and the second magnetic latch system member. The one or more adjustable stop members can be disposed on and/or at least partly in the moveable mount configured to contact the first post and/or a stop member extending therefrom in the first position. Any other suitable position is contemplated herein.

The one or more adjustable stop members can include a screw threaded to the moveable mount, for example. The one or more adjustable stop members may be made of non-ferrous material, for example.

In certain embodiments, the first magnetic latch system member can be disposed within a pocket defined in the first post. The first post can include an opening defined therethrough to reduce or eliminate magnetic interference of the first post with the first magnetic latch system member. The opening can be smaller than the first magnetic latch system member, for example. The first post can be made of aluminum, for example, or any other suitable material.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
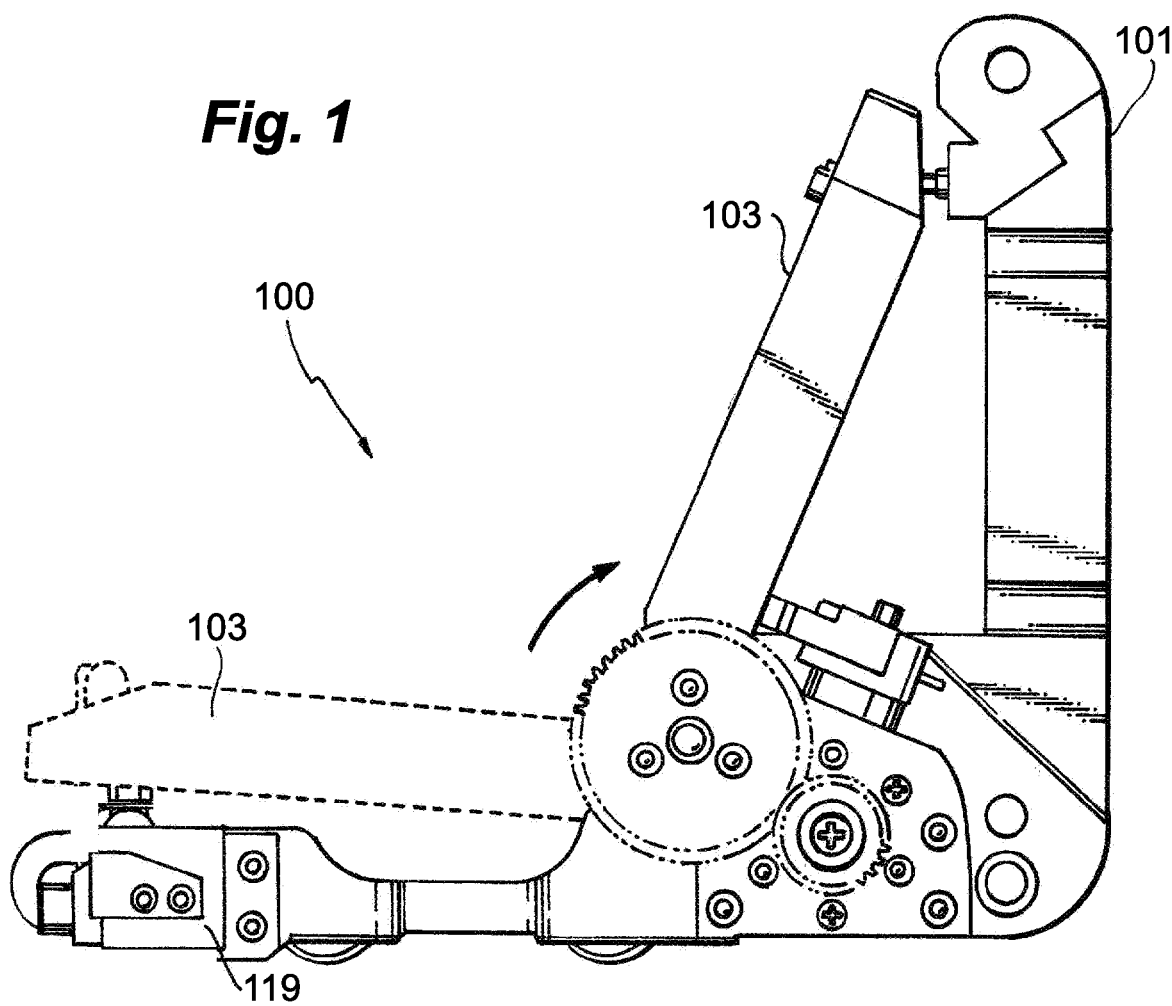
FIG. 1 is a side view of an embodiment of an assembly in accordance with this disclosure, showing a mirror mount in a first position and in a second, down position (in phantom)

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1 and is designated generally by reference character 100. Other embodiments and/or aspects of this disclosure are shown in FIGS. 2 and 3.

Referring to FIG. 1, an optical system mount assembly 100 can include a first post 101 and a movable mount 103 configured to mount an optical element (not shown). The moveable mount 103 can be configured to move relative to the first post 101 assembly between a first position (e.g., as shown in FIG. 1) and a second position (e.g., as shown in phantom in FIG. 1), as shown this is using a pivot around an axis/axle.

Figure 2:
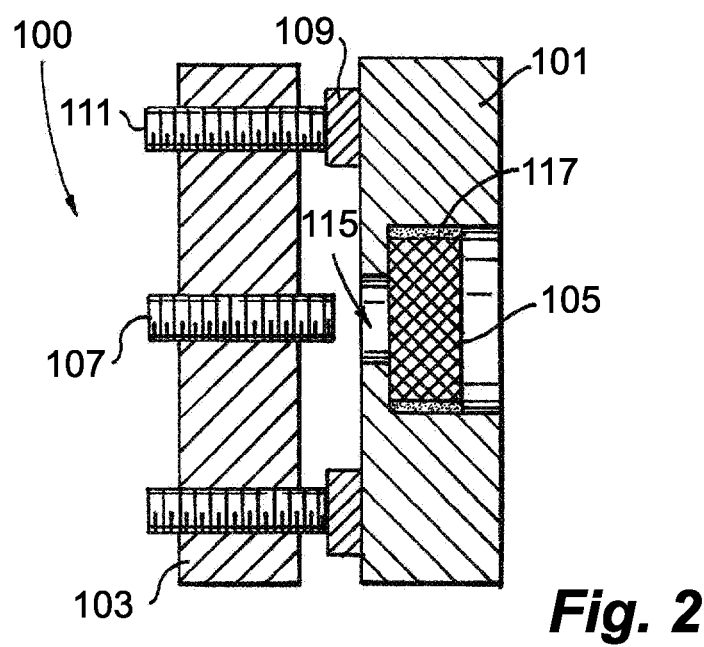
FIG. 2 is a cross-sectional view of an embodiment of an assembly in accordance with this disclosure.
Figure 3:
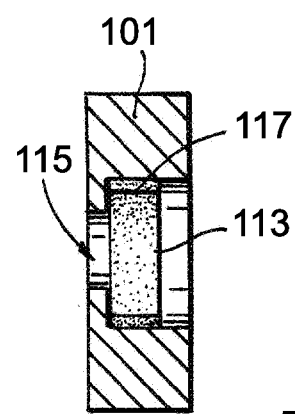
FIG. 3 is a cross-sectional view of an embodiment of a post in accordance with this disclosure.

Referring additionally to FIG. 2, the assembly 100 can include a first magnetic latch system member 105 disposed on or within the first post 101. The assembly 100 can also include a second magnetic latch system member 107 disposed on or within the moveable mount 103 such that the first magnetic latch system member 105 magnetically interacts with the second magnetic latch system member 107 to magnetically latch the moveable mount 103 to the first post 101 in the first position (e.g., as shown in FIGS. 1 and 2). The first and second magnetic latch system members 105, 107 can be configured to have or produce any suitable attraction force between each other.

In certain embodiments, the first magnetic latch system member 105 can be or include a permanent magnet. In certain embodiments, the first magnetic latch system member 105 can be or include a rare earth magnet, for example.

In certain embodiments, the second magnetic latch system member 107 can be or include a ferromagnetic element. For example, the ferromagnetic element can be a metallic screw, e.g., as shown in FIG. 2, and can be threaded to the moveable mount 103. Any other suitable structure is contemplated herein for the second magnetic latch system member 107. In certain embodiments, the second magnetic latch system member 107 can be a permanent magnet.

At least one of the first magnetic latch system member 105 and the second magnetic latch system member 107 can be adjustable such that an attraction force between the first magnetic latch system member 105 and the second magnetic latch system member 107 is adjustable. For example, the second latch system member 107 can be moveable relative to the movable mount 103 to change the distance of the second magnetic latch system member 107 relative to the first magnetic latch system member 105 when in the first position.

In certain embodiments, the first position can be an upright alignment position as shown. The optical element can be a mirror and, therefore, the moveable mount 103 can be a mirror mount.

The assembly 100 can further include one or more stop members (e.g., stop members 109, 111) extending from at least one of the first post member 101 or the moveable mount 103. The one or more stop members can include one or more fixed stop members 109 disposed on the first post member 101. The one or more fixed stop members 109 can include three or more fixed stop members 109, for example, or any other suitable number.

The one or more stop members can include one or more adjustable stop members 111 configured to allow adjustment of the distance between the first post 101 and the moveable mount 103 in the first position, e.g., to allow alignment of the optical element and/or to allow adjustment of an attraction force between the first magnetic latch system member 105 and the second magnetic latch system member 107. The one or more adjustable stop members 111 can be disposed on and/or at least partly in the moveable mount 103 configured to contact the first post 101 and/or a stop member (e.g., a fixed stop member 109) extending from the first post 101 in the first position. Any other suitable position and/or arrangement for the stop members 109, 111 is contemplated herein.

As shown in FIG. 2, the one or more adjustable stop members 111 can include a screw threaded to the moveable mount 103, for example. The one or more adjustable stop members 111 may be made of non-ferrous material, for example, or any other suitable material. The one or more stop members 109, 111 can include any suitable material (e.g., hardened steel), ferrous or otherwise.

In certain embodiments, referring additionally to FIG. 3, the first magnetic latch system member 105 can be disposed within a pocket 113 defined in the first post 101. The first post 101 can include an opening 115 defined therethrough to reduce or eliminate magnetic interference of the first post 101 with the first magnetic latch system member 105. The opening 115 can be smaller than the first magnetic latch system member 105, for example, e.g., to retain the first magnetic latch system member 105 to the first post 101. The first post 101 can be made of aluminum, for example, or any other suitable material.

The first magnetic latch system member 105 (e.g., a permanent magnet) can be attached to the first post 101 in any suitable manner. For example, the first magnetic latch system member 105 can be attached in the pocket 113 using an adhesive 117 (e.g., RTV).

Certain embodiments of an assembly include a second post structure 119. It is contemplated that the second post structure 119 can include another magnetic latch system member (e.g., member 105 and/or member 109) configured to magnetically interact with the mirror mount 103 in the second position, e.g., as shown in phantom in FIG. 1.

Embodiments can include a mirror housing that is retained with interacting magnetic latch members to a post to have a positive force retaining to a stop to maintain optical alignment or as shown, to maintain the mirror in the "stowed" position. In certain embodiments, the interaction force is strong enough to counteract forces of flying an aircraft to retain optical alignment under all operating conditions. In certain embodiments an opening defined through the post can allow a smaller magnet to be used to generate same force because there is no material front blocking the magnetic field.

Embodiments can use a magnet with an adjuster ferrous material or other magnet to form a magnetic latch, which allows the removal of the traditional flexure, and which makes the adjustment of the assembly simpler and less costly.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An optical system mount assembly, comprising:
   a first post;
   a movable mount configured to mount an optical element, wherein the moveable mount is configured to move relative to the first post assembly between a first position and a second position;
   a first magnetic latch system member disposed on or within the first post; and
   a second magnetic latch system member disposed on or within the moveable mount such that the first magnetic latch system member magnetically interacts with the second magnetic latch system member to magnetically latch the moveable mount to the first post in the first position, wherein at least one of the first magnetic latch system member and the second magnetic latch system member is adjustable such that an attraction force between the first magnetic latch system member and the second magnetic latch system member is adjustable, wherein the second latch system member is moveable relative to the movable mount to change the distance of the second magnetic latch system member relative to the first magnetic latch system member when in the first position.

2. The assembly of claim 1, wherein the first magnetic latch system member is a permanent magnet.

3. The assembly of claim 2, wherein the second magnetic latch system member is a ferromagnetic element.

4. The assembly of claim 3, wherein the ferromagnetic element is a metallic screw.

5. The assembly of claim 1, wherein the first position is an upright alignment position.

6. The assembly of claim 5, wherein the optical element is a mirror and the moveable mount is a mirror mount.

7. The assembly of claim 1, further comprising one or more stop members extending from at least one of the first post or the moveable mount.

8. The assembly of claim 7, wherein the one or more stop members includes one or more fixed stop members disposed on the first post.

9. The assembly of claim 8, wherein the one or more fixed stop members includes three or more fixed stop members.

10. The assembly of claim 7, wherein the one or more stop members includes one or more adjustable stop members configured to allow adjustment of the distance between the first post and the moveable mount in the first position to allow alignment of the optical element and to allow adjustment of an attraction force between the first magnetic latch system member and the second magnetic latch system member.

11. The assembly of claim 10, wherein the one or more adjustable stop members are disposed on in the moveable mount configured to contact the first post and a stop member extending therefrom in the first position.

12. The assembly of claim 10, wherein the one or more adjustable stop members include a screw threaded to the moveable mount.

13. The assembly of claim 12, wherein the one or more adjustable stop members are made of non-ferrous material.

14. The assembly of claim 1, wherein the first magnetic latch system member is disposed within a pocket defined in the first post.

15. The assembly of claim 14, wherein the first post includes an opening defined therethrough to reduce or eliminate magnetic interference of the first post with the first magnetic latch system member.

16. The assembly of claim 15, wherein the opening is smaller than the first magnetic latch system member.

17. The assembly of claim 16, wherein the first post is made of aluminum.

* * * * *